United States Patent
Yi et al.

(10) Patent No.: US 10,078,490 B2
(45) Date of Patent: Sep. 18, 2018

(54) MOBILE DEVICE AND CONTROLLING METHOD THEREFOR

(71) Applicant: LG ELECTRONICS INC., Seoul (KR)

(72) Inventors: Eunhee Yi, Seoul (KR); Jinhee Lee, Seoul (KR); Junhee Yeo, Seoul (KR); Doyoung Lee, Seoul (KR); Kiho Lee, Seoul (KR); Jinyung Park, Seoul (KR); Younghyun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 444 days.

(21) Appl. No.: 14/782,567

(22) PCT Filed: Jul. 31, 2013

(86) PCT No.: PCT/KR2013/006874
§ 371 (c)(1),
(2) Date: Oct. 5, 2015

(87) PCT Pub. No.: WO2014/163246
PCT Pub. Date: Oct. 9, 2014

(65) Prior Publication Data
US 2016/0026431 A1    Jan. 28, 2016

Related U.S. Application Data

(60) Provisional application No. 61/807,771, filed on Apr. 3, 2013.

(51) Int. Cl.
*G06F 3/16* (2006.01)
*G06F 3/00* (2006.01)
(Continued)

(52) U.S. Cl.
CPC ............ *G06F 3/167* (2013.01); *G06F 1/1694* (2013.01); *G06F 3/002* (2013.01); *G06F 3/012* (2013.01);
(Continued)

(58) Field of Classification Search
CPC ...... G06F 3/167; G06F 3/0346; G06F 1/1694; G06F 3/0488; G06F 3/012; G06F 3/013;
(Continued)

(56) References Cited

U.S. PATENT DOCUMENTS

2008/0221877 A1  9/2008 Sumita
2012/0001943 A1  1/2012 Ishidera
(Continued)

FOREIGN PATENT DOCUMENTS

EP     0 735 521 A2  10/1966
KR   10-2012-0003369 A   1/2012
(Continued)

*Primary Examiner* — Aneeta Yodichkas
(74) *Attorney, Agent, or Firm* — Birch, Stewart, Kolasch & Birch, LLP

(57) ABSTRACT

The present invention relates to a mobile device and a method for controlling the same. In particular, the present invention relates to a mobile device and a method for controlling the same, which provides response date to a voice command by variously setting a feedback scheme for providing the response data depending on the way that a user uses the mobile device.

20 Claims, 8 Drawing Sheets

(51) Int. Cl.
*G06F 3/01* (2006.01)
*G06F 3/0488* (2013.01)
*G06F 1/16* (2006.01)
*G06F 3/0346* (2013.01)
*H04M 1/725* (2006.01)
*G10L 15/22* (2006.01)

(52) U.S. Cl.
CPC ............ *G06F 3/013* (2013.01); *G06F 3/0346* (2013.01); *G06F 3/0488* (2013.01); *G06F 3/165* (2013.01); *G10L 15/22* (2013.01); *G06F 2200/1637* (2013.01); *G06F 2203/0381* (2013.01); *G10L 2015/223* (2013.01); *H04M 1/72522* (2013.01); *H04M 2250/74* (2013.01)

(58) Field of Classification Search
CPC .. G06F 3/002; G06F 3/165; G06F 2203/0381; G06F 2200/1637; G10L 15/22; G10L 2015/223; H04M 2250/74; H04M 1/72522
See application file for complete search history.

(56) References Cited

U.S. PATENT DOCUMENTS

2012/0316876 A1   12/2012  Jang et al.
2013/0033422 A1    2/2013  Choi et al.

FOREIGN PATENT DOCUMENTS

KR    10-2013-0018464 A    2/2013
WO    WO 2012/169679 A1   12/2012

MOBILE DEVICE AND CONTROLLING METHOD THEREFOR

CROSS REFERENCE TO RELATED APPLICATIONS

This application is the National Phase of PCT International Application No. PCT/KR2013/006874, filed on Jul. 31, 2013, which claims priority under 35 U.S.C. 119(e) to U.S. Provisional Application No. 61/807,771, filed on Apr. 3, 2013, all of which are hereby expressly incorporated by reference into the present application.

TECHNICAL FIELD

The present specification relates to a mobile device and a method of controlling therefor. More particularly, when response data is provided in response to a voice command, the present specification relates to a mobile device configured to differently set a feedback scheme providing the response data depending on a scheme for a user to use the mobile device and a method of controlling therefor.

BACKGROUND ART

Recently, dissemination of a smartphone is generalized. And, most of smartphones provides a voice command system. Hence, a user inputs a voice command to a smartphone and may be then able to obtain a result preferred by the user.

The voice command system corresponds to a system configured to recognize voice of a user using a voice recognition technology and perform a command according to the voice. Hence, the user can perform various jobs including telephone number search, dialing, message input based on voice or text conversion, title selection in case of playing an audio file, function control and the like using the voice command system of a mobile device.

Yet, a scheme of using the voice command system of the mobile device may vary depending on a user. For example, one user may input a voice command while watching a screen but another user may input a voice command while not watching a screen. Hence, it is necessary for the mobile device to differently provide response data in response to a voice command depending on a scheme for a user to use the voice command system.

DISCLOSURE OF THE INVENTION

Technical Tasks

One object of the present invention is to provide a mobile device configured to differently set a feedback scheme providing response data corresponding to a voice command according to a tilt angle of the mobile device and a method of controlling therefor.

Another object of the present invention is to provide a mobile device configured to differently set a feedback scheme providing response data corresponding to a voice command according to a grip or a gaze of a user using the mobile device and a method of controlling therefor.

Another object of the present invention is to provide a mobile device configured to differently set a direction of providing response data according to a feedback scheme providing response data corresponding to a voice command.

The other object of the present invention is to provide a mobile device configured to determine whether to provide voice data included in response data according to a feedback scheme providing the response data corresponding to a voice command.

TECHNICAL SOLUTION

To achieve these and other advantages and in accordance with the purpose of the present invention, as embodied and broadly described, according to one embodiment, a mobile device includes a display unit, an audio unit, a sensor unit configured to sense a tilt angle of the mobile device and a processor configured to control the display unit, the audio unit and the sensor unit. In this case, the processor is configured to receive a first voice command, the processor is configured to generate a first response data to make a response to the first voice command, and the processor is configured to select a feedback scheme to output the first response data. In this case, if the tilt angle belongs to a first tilt range, a first feedback scheme is selected and if the tilt angle belongs to a second tilt range, a second feedback scheme is selected. If the first feedback scheme is selected, the processor is configured to display the first response data at a first point corresponding to the top part of a screen and display additionally generated second response data in first direction ranging from the first point to a second point corresponding to the bottom part of the screen. If the second feedback scheme is selected, the processor is configured to display the first response data at the second point corresponding to the bottom part of the screen and display the additionally generated second response data in second direction ranging from the second point to the first point.

To further achieve these and other advantages and in accordance with the purpose of the present invention, according to a different embodiment, a method of controlling a mobile device includes the steps of receiving a first voice command, generating a first response data to make a response to the first voice command, selecting a feedback scheme to output the first response data, wherein if the tilt angle belongs to a first tilt range, a first feedback scheme is selected and wherein if the tilt angle belongs to a second tilt range, a second feedback scheme is selected, if the first feedback scheme is selected, displaying the first response data at a first point corresponding to the top part of a screen and displaying additionally generated second response data in first direction ranging from the first point to a second point corresponding to the bottom part of the screen and if the second feedback scheme is selected, displaying the first response data at the second point corresponding to the bottom part of the screen and displaying the additionally generated second response data in second direction ranging from the second point to the first point.

Advantageous Effects

According to one embodiment of the present invention, it is able to differently set a feedback scheme providing response data corresponding to a voice command according to a tilt angle of a mobile device. Hence, a user can receive the response data using a feedback scheme convenient for the user without a separate additional control while inputting a voice command.

According to another embodiment of the present invention, it is able to differently set a feedback scheme providing response data corresponding to a voice command according to a grip or a gaze of a user using a mobile device. Hence, a user can change a feedback scheme by changing the grip or the gaze without a separate additional control while inputting a voice command.

According to another embodiment of the present invention, it is able to differently set a direction of providing response data according to a feedback scheme providing response data corresponding to a voice command. Hence, a user can conveniently watch the response data according to the feedback scheme while inputting a voice command.

According to the other embodiment of the present invention, it is able to determine whether to provide voice data included in response date according to a feedback scheme providing response data corresponding to a voice command. Hence, a mobile device can reduce unnecessary noise as occasion demands.

BEST MODE

Although terminologies used in the present specification are selected from general terminologies used currently and widely in consideration of functions, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the specification. Therefore, terminologies used in the present specification need to be construed based on the substantial meanings of the corresponding terminologies and the overall matters disclosed in the present specification rather than construed as simple names of the terminologies.

Moreover, while the embodiments have been concretely described with reference to the attached diagrams and the contents written on the diagrams, the present specification may be non-restricted or non-limited to the embodiments.

Figure 1:
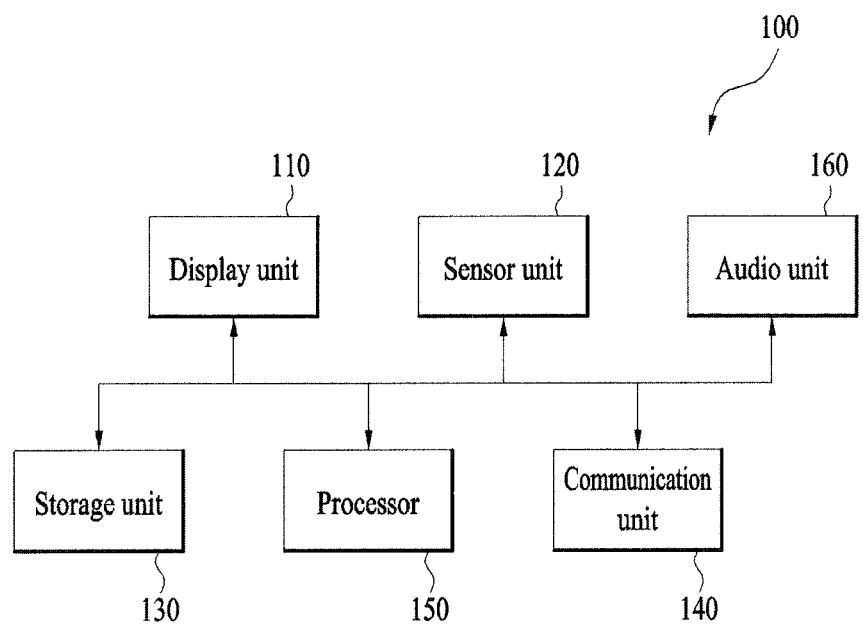
FIG. 1 is a function diagram for a mobile device according to one embodiment.

FIG. 1 is a function diagram for a mobile device according to one embodiment. Yet, FIG. 1 is just one embodiment and a partial configuration module can be deleted or a new configuration module can be added according to the necessity of those skilled in the art.

As shown in FIG. 1, a mobile device 100 according to one embodiment can include a display unit 110, a sensor unit 120, a storage unit 130, a communication unit 140, a processor 150 and an audio unit 160.

The display unit 110 can output image data on a display screen. And, the display unit 110 can output an image based on contents executed by the processor 150, an application or a control command of the processor 150. And, the display unit 110 can output a text corresponding to a voice command and response data corresponding to a voice command.

The sensor unit 120 senses surrounding environment of the mobile device 100 using at least one or more sensors installed in the mobile device 100 and can deliver a sensed result to the processor 150 in a signal form. And, the sensor unit 120 senses a user input and can deliver a signal according to a sensed result to the processor 150. In this case, the processor 150 can detect a signal generated by a user input along with a signal delivered from a touch sensor among many received signals.

Hence, the sensor unit 120 can include at least one or more sensing means. As an embodiment, the at least one or more sensing means can include such a sensing means as a gravity sensor, a terrestrial magnetism sensor, a motion sensor, a gyroscope sensor, an acceleration sensor, an infrared sensor, a tilt (inclination) sensor, a brightness sensor, an altitude sensor, a smell sensor, a temperature sensor, a depth sensor, a pressure sensor, a bending sensor, an audio sensor, a video sensor, a GPS (global positioning system) sensor, a touch sensor, a grip sensor, and the like. Hence, the sensor unit 120 can sense a tilt angle of the mobile device 100.

And, the sensor unit 120 can detect an input signal inputted on the mobile device 100. In this case, the input signal inputted on the mobile device 100 can include a gaze input, a touch input, a voice input, a gesture input and the like inputted on the mobile device 100. Hence, the mobile device 100 can detect a voice input for a voice command through the sensor unit 120 or the audio unit 160 described in the following.

And, the sensor unit 120 is a common name for the aforementioned various sensing means. The sensor unit senses various inputs of a user and environment of the mobile device 100 and can deliver a sensed result to the processor 150 to make the processor perform an operation in accordance with the sensed result. The aforementioned sensors can be included in the mobile device 100 as a separate element or can be included in the mobile device in a manner of being integrated into at least one element.

And, if the aforementioned display unit 110 includes a touch sensitive display, the mobile device 100 may sense such a user input as a touch input using the display unit 110.

Hence, the processor 150 recognizes a signal according to a user input delivered from at least one selected from the group consisting of the display unit 110, the sensor unit 120 and the audio unit 160 and may be then able to control the mobile device 100 according to the signal.

In other word, the processor 150 can detect a signal delivered from at least one selected from the group consisting of the display unit 110, the sensor unit 120 and the audio unit 160 among signals delivered from configuration units. In particular, the processor can detect a signal generated by a user input received from a specific sensor among many received signals. For example, if the sensor unit 120 senses a user input, the processor 150 can detect a signal corresponding to the input using a sensed result.

In the following, if each step or operation performed in the mobile device is initiated or progressed by a user input, assume that a process of generating a signal according to the user input is explained in the aforementioned explanation, although it is not repeatedly explained.

And, it may be able to represented as the processor controls the mobile device or a configuration unit included in the mobile device according to a user input and it might say that the processor and the mobile device are identical to each other.

The storage unit 130 can store various digital data including audio, pictures, videos, applications and the like. The storage unit corresponds to various digital data storage space including a flash memory, a RAM (random access memory), an SSD (solid state drive) and the like.

The storage unit 130 can store contents displayed on the mobile device 100. And, the storage unit 130 can store a text corresponding to a voice command and response data corresponding to a voice command.

And, the storage unit 130 can temporarily store data received from an external device via the communication unit 140. In other word, the storage unit 130 can be used for buffering to output the data received from the external device on the mobile device 100.

The communication unit 140 performs communication with an external device using various protocols and may be able to transceive data with the external device. And, the communication unit 140 accesses an external network in wired or wireless and may be able to transceive digital data including contents, applications and the like with the external network. Hence, the mobile device 100 can search for or collect response data corresponding to a voice command via the communication unit 140.

The audio unit 160 can include an audio input means such as a microphone and the like and an audio output means such as a speaker, earphone and the like. Hence, the audio unit 160 can detect a voice input for a voice command via the audio input means. And, the audio unit 160 can output response data corresponding to a voice command by voice via the audio output means. In particular, the audio unit 160 can output a command result by voice based on a voice command through a voice command system.

Besides, although it is not depicted in FIG. 1, a power unit (not depicted) corresponds to an internal battery of a device or a power source connected with an external power source and may be able to supply power to the mobile device 100.

Meanwhile, the mobile device 100 shown in FIG. 1 corresponds to a block diagram according to one embodiment. Blocks represented in a manner of being separated from each other correspond to elements of a device logically distinguished from each other. Hence, elements of the aforementioned device can be implemented by a single chip or a plurality of chips depending on a design of the device.

Meanwhile, a voice command system corresponds to a system configured to recognize voice of a user using a voice recognition technology and perform a command according to the voice. Hence, the user can perform various jobs using the voice command system of a mobile device.

Yet, a scheme of using the voice command system of the mobile device may vary depending on a user. For example, one user may input a voice command while watching a screen but another user may input a voice command while not watching a screen. Hence, it is necessary for the mobile device to differently provide response data in response to a voice command depending on a scheme for a user to use the voice command system. Regarding this, it shall be explained in detail with reference to FIG. 2 and FIG. 3 in the following.

Figure 2A:
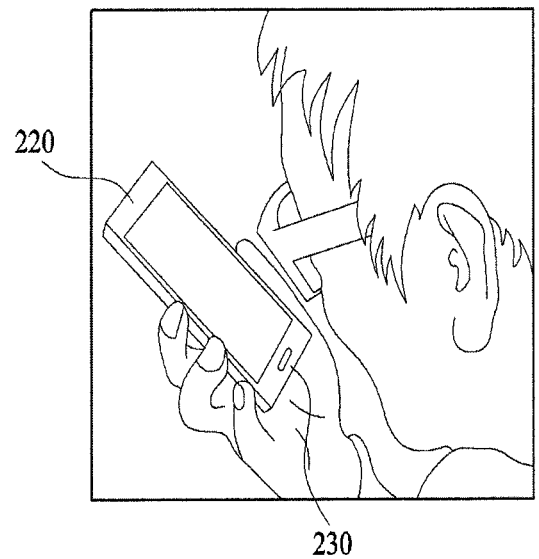
FIGS. 2A and 2B are a diagram for one embodiment of a mobile device selecting a first feedback scheme.
Figure 2B:
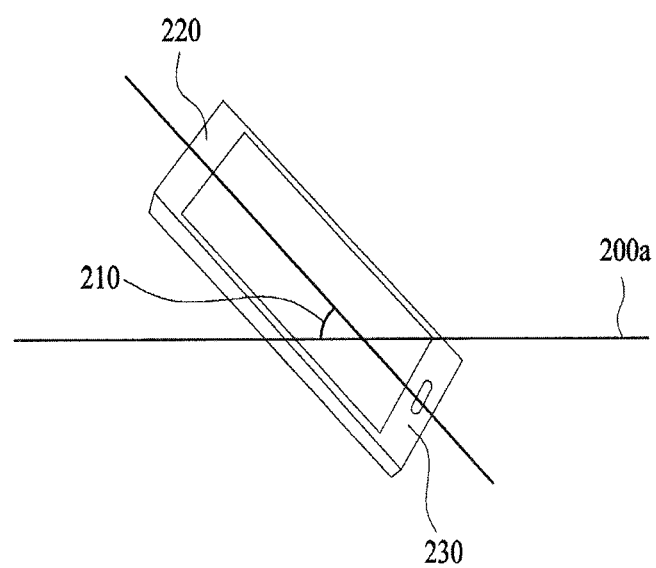

FIG. 2 is a diagram for one embodiment of a mobile device selecting a first feedback scheme.

If a user inputs a voice command using a voice command system, the mobile device can provide response data to the user in response to the voice command. In this case, the response data is provided in such a visual data form as a text, a video, a web page and the like in general. Hence, in order to watch the response data according to the voice command, as shown in FIG. 2 (a), the user can use the voice command system in a state that a face of the user is positioned at the front of the mobile device.

If the user uses the mobile device as shown in FIG. 2 (a), as shown in FIG. 2 (b), a tilt angle 210 of the mobile device may belong to a first tilt range. In this case, the first tilt range corresponds to an angle range for tilting the mobile device to make the top part 220 of the mobile device to be positioned higher than the bottom part 230 of the mobile device on the basis of a horizontal state 200a of the mobile device.

As mentioned in the above, if the tilt angle belongs to the first tilt range, the mobile device according to one embodiment can select a first feedback scheme. Regarding the first feedback scheme, it shall be described in detail with reference to FIG. 4.

Figure 3A:
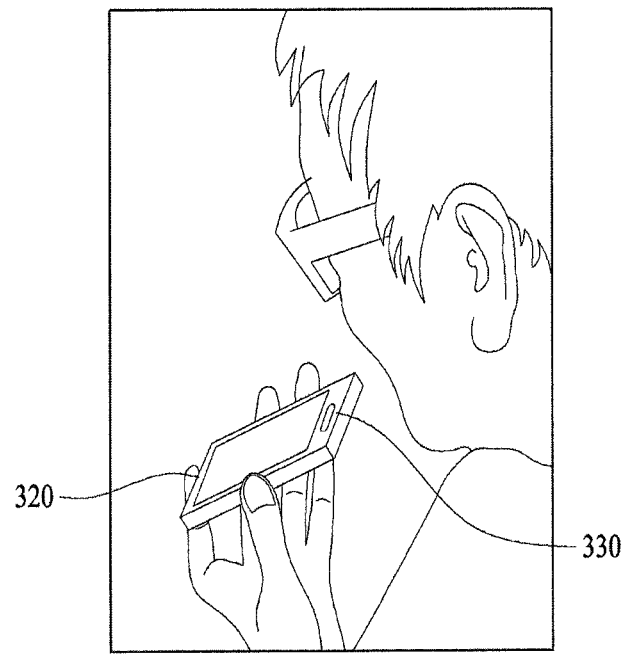
FIGS. 3A and 3B are a diagram for one embodiment of a mobile device selecting a second feedback scheme.
Figure 3B:
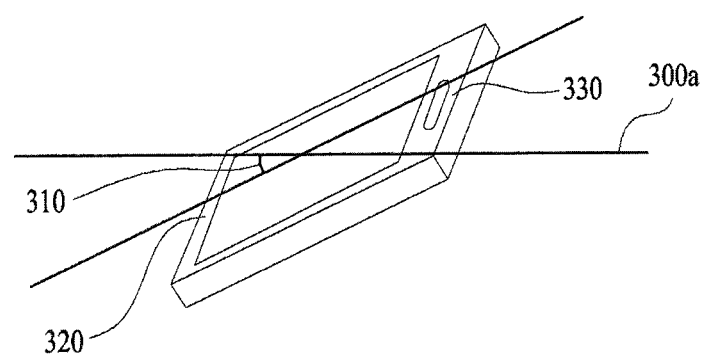

FIG. 3 is a diagram for one embodiment of a mobile device selecting a second feedback scheme.

When a user inputs a voice command using a voice command system, the user often puts a microphone sensor embedded in the mobile device near a mouth of the user. In this case, the microphone sensor is often positioned at the bottom of the mobile device.

Hence, as shown in FIG. 3 (a), the user can perform a voice command in a state that the mobile device is tilted to make the bottom 330 of the mobile device to be close to the mouth of the user.

If the user uses the mobile device as shown in FIG. 3 (a), a tilt angle 310 of the mobile device may belong to a second tilt range. In this case, the second tilt range corresponds to an angle range for tilting the mobile device to make the top part 320 of the mobile device to be positioned lower than the bottom part 330 of the mobile device on the basis of a horizontal state 300a of the mobile device.

As mentioned in the above, if the tilt angle belongs to the second tilt range, the mobile device according to one embodiment can select a second feedback scheme. Regarding the second feedback scheme, it shall be described in detail with reference to FIG. 5.

Figure 4:
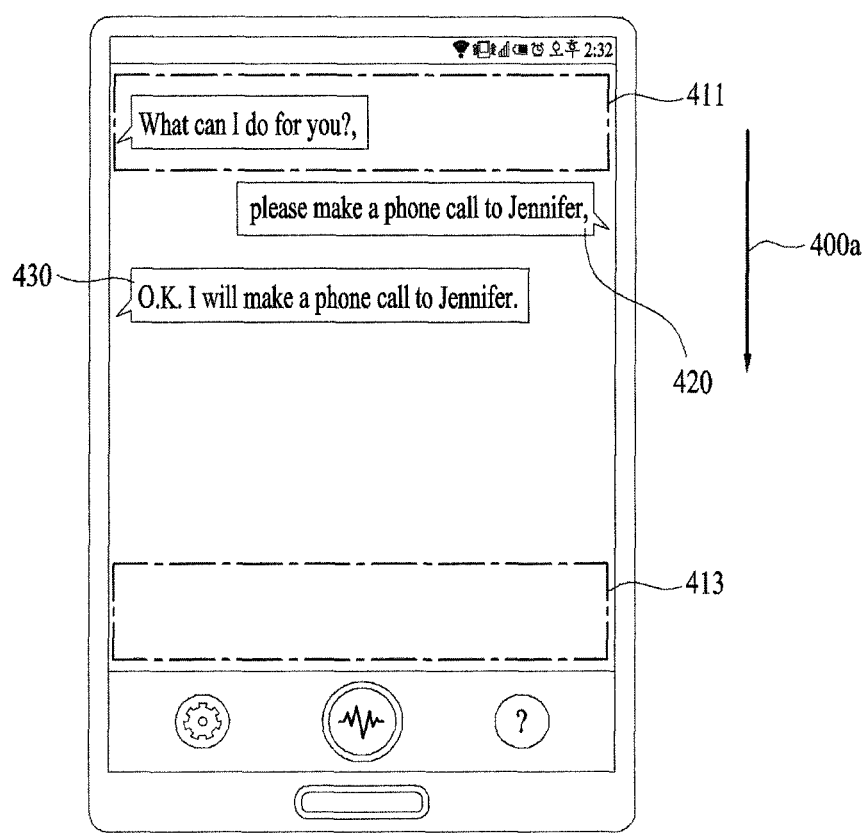
FIG. 4 is a diagram for one embodiment of a mobile device providing response data according to a first feedback scheme.

FIG. 4 is a diagram for one embodiment of a mobile device providing response data according to a first feedback scheme.

If a first voice command is received, a mobile device according to one embodiment can generate first response data to make a response to the first voice command. In this case, the mobile device can output a text 420 corresponding to the first voice command to enable a user to know a voice command history. Hence, the first response data can include the text 420 corresponding to the first voice command as well as data 430 related to a result corresponding to the first voice command.

And, the mobile device can generate the first response data to make a response to the first voice command. And, the mobile device can select a feedback scheme to output the first response data. If a tilt angle of the mobile device belongs to a first tilt range, the mobile device can select the first feedback scheme. In this case, the first tilt range corresponds to an angle range for tilting the mobile device to make the top part of the mobile device to be positioned higher than the bottom part of the mobile device on the basis of a horizontal state of the mobile device.

The first feedback scheme corresponds to a feedback scheme that the mobile device displays the first response data at a first point 411 corresponding to the top part of a screen and displays additionally generated second response data in first direction 400a ranging from the first point 411 to a second point 413 corresponding to the bottom part of the screen.

As mentioned earlier in FIG. 2, the first feedback scheme corresponds to a feedback scheme which is selected in case that a face of a user is positioned at the front of the screen. Hence, readability of a user can be enhanced in a manner that the mobile device provides such a visual data as a text and the like related to a voice command to the user in the first direction 400a.

In particular, in case that the user uses the mobile device by tilting the mobile device within the first tilt range, the mobile device provides the newly added second response data in the first direction 400a and may be able to maintain the previously provided first response data on the screen as it is.

And, the mobile device receives a second voice command and may be able to generate third response data to make a response to the second voice command. Yet, in this case, if there is no empty space on the screen, the mobile device can move at least one of the first response data and the second response data displayed on the screen in second direction corresponding to direction opposite to the first direction 400a. In particular, the second direction corresponds to direction ranging from the second point 413 to the first point 411. Hence, the mobile device can display the third response data at the second point 413.

Hence, as shown in FIG. 4, after the first feedback scheme is selected by the mobile device, the additionally provided response data is gradually going down to the bottom part 413 of the screen. Subsequently, if the screen is filled with the response data, the previously provided response data is moved to the top part 411 of the screen, i.e., the second direction, and the newly provided response data is displayed at the bottom part 413 of the screen.

Figure 5:
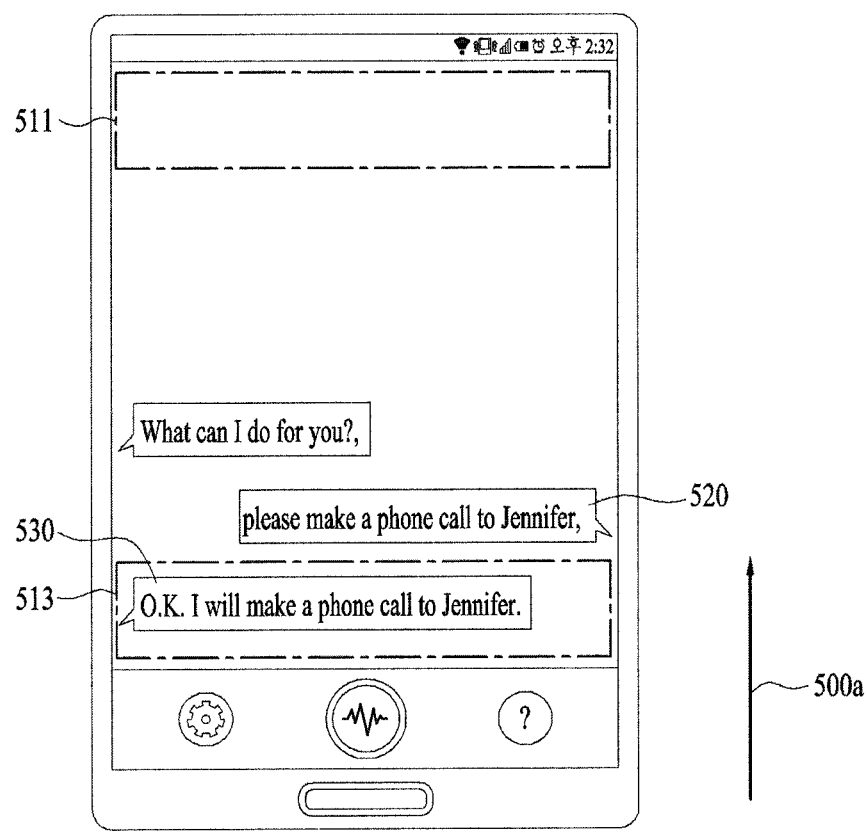
FIG. 5 is a diagram for one embodiment of a mobile device providing response data according to a second feedback scheme.

FIG. 5 is a diagram for one embodiment of a mobile device providing response data according to a second feedback scheme.

If the mobile device according to one embodiment receives a first voice command, the mobile device can generate a first response data to make a response to the first voice command. In this case, the mobile device can output a text 520 corresponding to the first voice command to enable a user to know a voice command history.

And, the mobile device can generate a first response data 530 to make a response to the first voice command. And, the mobile device can select a feedback scheme to output the first response data 530. If a tilt angle of the mobile device belongs to a second tilt range, the mobile device can select a second feedback scheme. In this case, the second tilt range corresponds to an angle range for tilting the mobile device to make the top part of the mobile device to be positioned lower than the bottom part of the mobile device on the basis of a horizontal state of the mobile device.

The second feedback scheme corresponds to a feedback scheme that the mobile device displays the first response data at a second point 513 corresponding to the bottom part of a screen and displays additionally generated second response data in second direction 500a ranging from the second point 513 to a first point 511 corresponding to the top part of the screen.

As mentioned earlier in FIG. 3, the second feedback scheme corresponds to a feedback scheme which is selected in case that a face of a user is not positioned at the front of the screen. The bottom part 513 of the mobile device is closer to eyes of a user and the top part 511 of the mobile device is relatively far from the eyes of the user. Hence, as shown in FIG. 5, the mobile device provides the first response data in the second direction 500a from the bottom part 513 of the screen to provide the user with environment capable of watching response data corresponding to a voice command without any inconvenience.

In particular, if the second feedback scheme is selected, the mobile device moves the previously displayed response data 520 in the second direction 500a and may be able to display the additionally generated response data 530 at the second point 513.

And, the mobile device receives a second voice command and may be able to generate third response data to make a response to the second voice command. Yet, in this case, if there is no empty space on the screen, the mobile device can move at least one of the first response data and the second response data displayed on the screen in the second direction 500a. Hence, the mobile device can display the third response data at the second point 513.

As mentioned in the foregoing description, the mobile device can provide response data in different direction according to a feedback scheme until the screen is filled with the response data. Yet, if there is no empty space on the screen due to the previously provided response data, the mobile device moves the previously displayed response data in the second direction 500a and may be able to provide newly provided response data at the second point 513 irrespective of a selected feedback scheme.

Hence, as shown in FIG. 5, after the second feedback scheme is selected by the mobile device, the mobile device moves the previously provided response data in the second direction 500a and may be able to display the additionally provided response data at the bottom part 513 of the screen all the time. Hence, unlike what is mentioned earlier in FIG. 4, although the screen is filled with response data, having selected the second feedback scheme, the mobile device can display response data using an identical method.

Meanwhile, one embodiment of selecting a feedback scheme according to a tilt angle of a mobile device is explained in the foregoing description. Yet, unlike what is mentioned in the foregoing description, the mobile device detects a grip pattern of a user and may be then able to select a feedback scheme according to the detected grip pattern.

In particular, if the detected grip pattern corresponds to a first grip pattern, the mobile device selects a first feedback scheme. On the contrary, if the detected grip pattern corresponds to a second grip pattern, the mobile device can select a second feedback scheme.

For example, the first grip pattern may correspond to a pattern of a user holding the mobile device to make a front side of the mobile device face a face of the user. Hence, if the user grips the mobile device in a state that an index finger of the user touches one side of the mobile device and the remaining four fingers of the user touch another side of the mobile device, the mobile device can configure the aforementioned case as a first grip pattern in advance.

And, the second grip pattern may correspond to a pattern of the user holding the mobile device to make the bottom part of the mobile device face the face of the user. Hence, if the user grips the mobile device in a state that the index finger of the user touches one side of the mobile device and the index finger and a middle finger of the user touch another side of the mobile device, the mobile device can configure the aforementioned case as a second grip pattern in advance.

As a different example, when a user grips the mobile device, if a point touched by a finger is not one-sided on the basis of a center of the mobile device, the mobile device can configure the aforementioned case as a first grip pattern. Hence, when a user grips the mobile device, if a point touched by a finger is one-sided to the bottom part on the basis of the center of the mobile device, the mobile device can configure the aforementioned case as a second grip pattern.

And, unlike what is mentioned earlier, the mobile device detects a gaze of a user and may be able to select a feedback scheme according to a result of detecting the gaze of the user. For example, if the mobile device detects the gaze of the user, the mobile device can select a first feedback scheme. On the contrary, if the mobile device is unable to detect the gaze of the user, the mobile device can select a second feedback scheme.

And, the mobile device detects a face of a user and may be able to select a feedback scheme according to a result of detecting the face of the user. For example, if the detected face of the user corresponds to a first condition, the mobile device selects a first feedback scheme. If the detected face of the user corresponds to a second condition, the mobile device can select a second feedback scheme.

The first condition and the second condition can be determined by at least one selected from the group consisting of a part of the detected face of the user, a position of the face and an area of the face.

For example, if a part of the detected face of the user corresponds to eyes, the mobile device can configure it as a first condition. If a part of the detected face of the user corresponds to a forehead, the mobile device can configure it as a second condition. And, if a face of a user is positioned at the center of an image which is captured to detect the user, the mobile device can configure it as a first condition. If the face of the user is positioned at the bottom of the image, the mobile device can configure it as a second condition. And, if an area of the detected face of the user is wider than a predetermined reference, the mobile device can configure it as a first condition. If the area is narrower than the predetermined reference, the mobile device can configure it as a second condition.

And, the mobile device detects a distance between a user and the mobile device and may be able to select a feedback scheme according to a result of detecting the distance. For example, if the mobile device receives a first voice command, the mobile device can detect a distance between the audio unit configured to sense a voice command and a user using the first voice command. If a detected distance is longer than a predetermined reference, the mobile device selects a first feedback scheme. If the detected distance is shorter than the predetermined reference, the mobile device can select a second feedback scheme.

Meanwhile, one embodiment that response data provided by the mobile device in response to a voice command corresponds to visual data is explained in the foregoing description. Yet, the response data can include audio data. Yet, the mobile device can determine whether to provide the audio data according to a selected feedback scheme. Regarding this, it shall be explained in detail with reference to FIG. 6 to FIG. 7 in the following.

Figure 6:
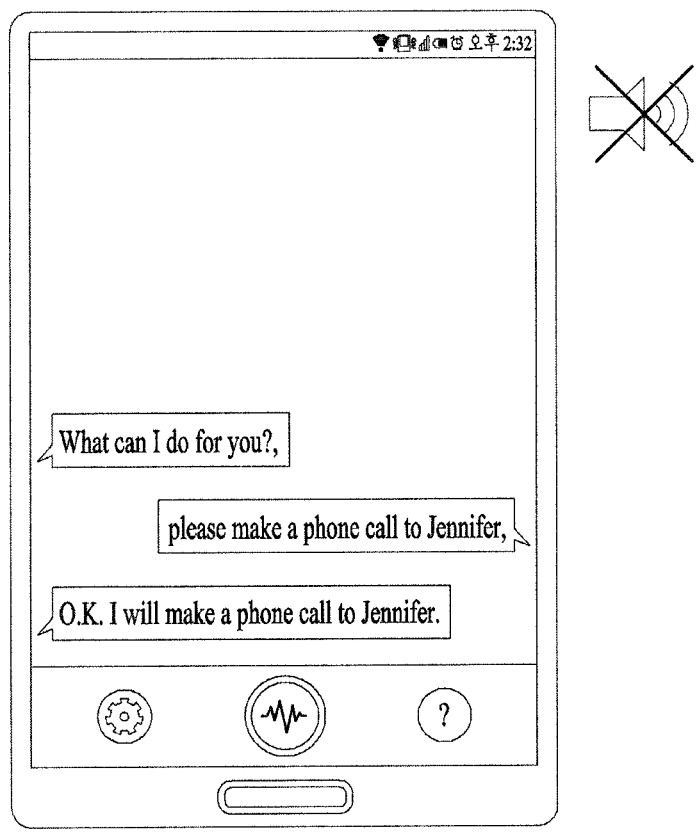
FIG. 6 is a diagram for a different embodiment of a mobile device providing response data according to a first feedback scheme.

FIG. 6 is a diagram for a different embodiment of a mobile device providing response data according to a first feedback scheme.

As mentioned earlier in FIG. 2, a user using a voice command system with a first feedback scheme may gaze upon a front side of a mobile device. Hence, since the user is able to see response data displayed on a screen, it is not necessary for the mobile device to repeatedly provide the user with audio data. Hence, as shown in FIG. 6, having selected the first feedback scheme, the mobile device may not output the audio data included in the response data corresponding to a voice command.

In particular, when the user uses a voice command system in a public place or indoors with different persons, the user may be cautious in inputting a voice command. This is because a voice command of the user and audio data included in response data corresponding to the voice command may become noise to other persons. Hence, in this case, the mobile device can provide the response data to the user with the first feedback scheme to prevent surrounding people of the user being damaged.

Figure 7:
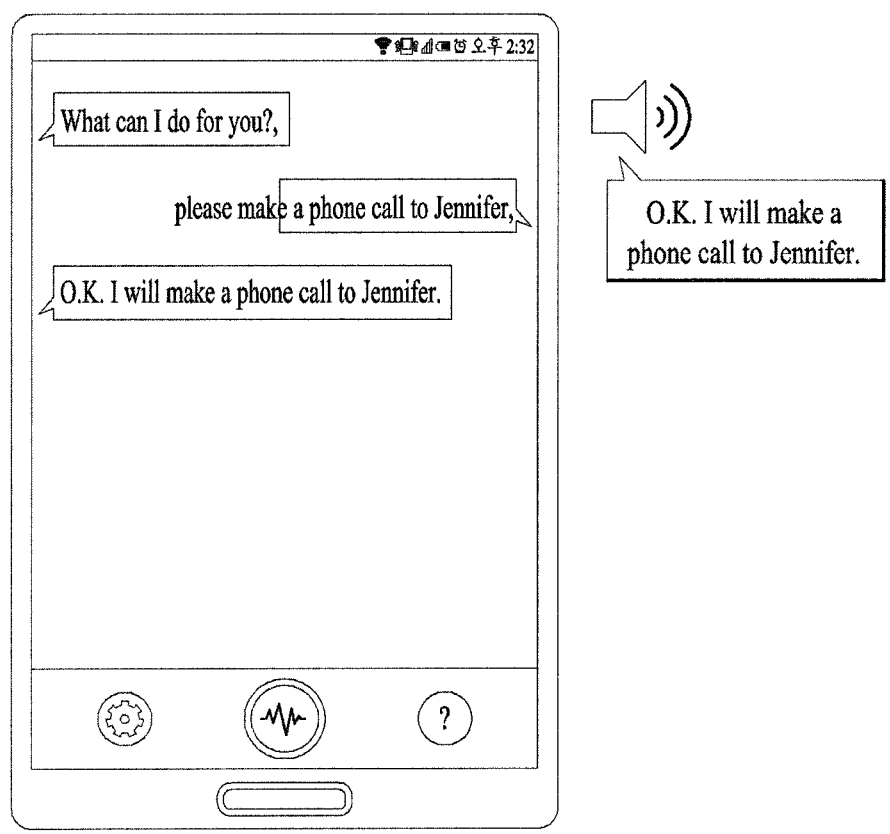
FIG. 7 is a diagram for a different embodiment of a mobile device providing response data according to a second feedback scheme.

FIG. 7 is a diagram for a different embodiment of a mobile device providing response data according to a second feedback scheme.

As mentioned earlier in FIG. 3, a user using a voice command system with a second feedback scheme is unable to gaze upon a front side of a mobile device. Hence, it may be more convenient for the user to receive a result according to a voice command in an audio data form rather than a visual data form. Hence, as shown in FIG. 7, having selected the second feedback scheme, the mobile device can also output audio data included in response data corresponding to the voice command.

Figure 8:
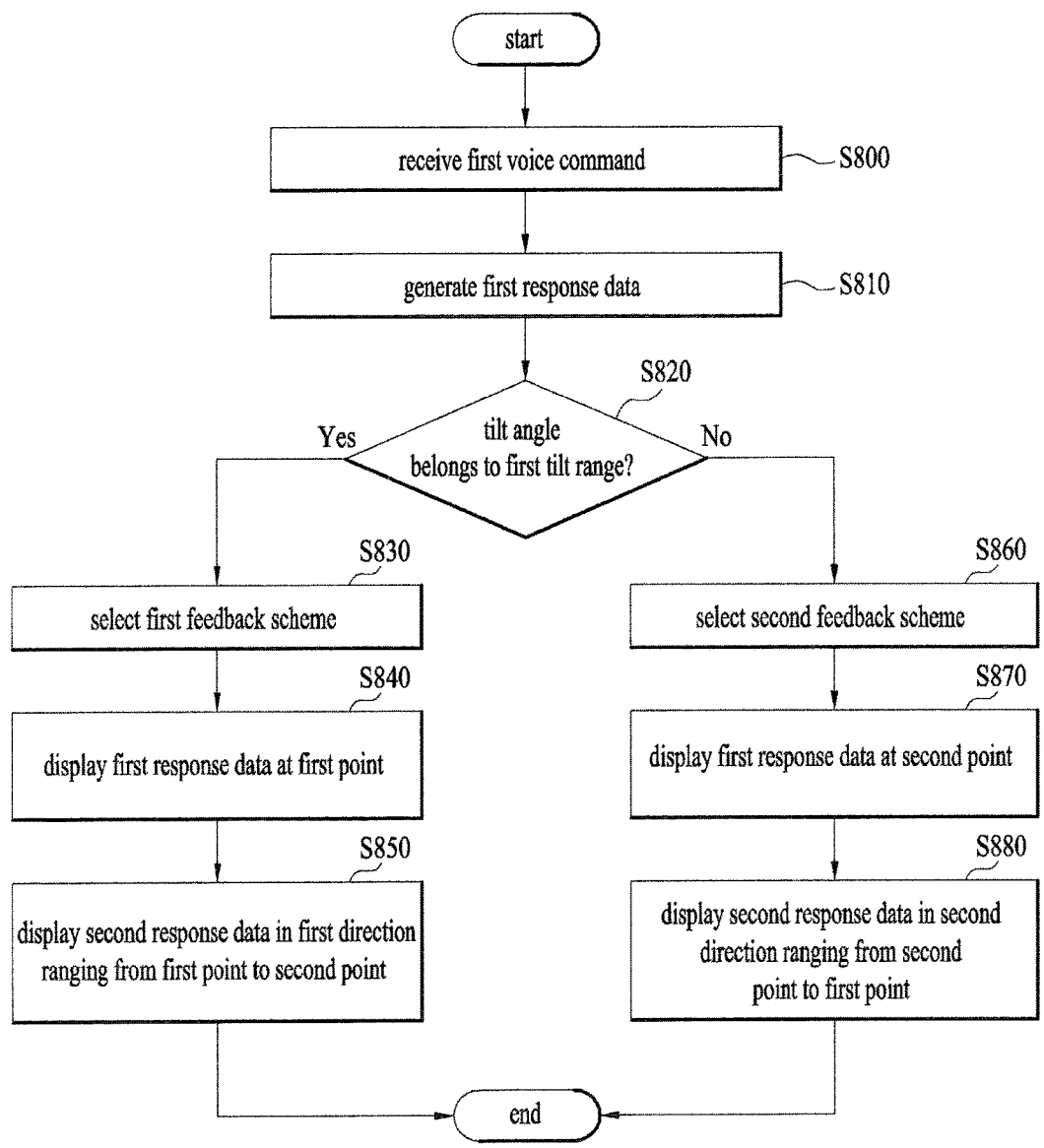
FIG. 8 is a flowchart for a method of controlling a mobile device according to one embodiment.

FIG. 8 is a flowchart for a method of controlling a mobile device according to one embodiment.

First of all, the mobile device can receive a first voice command [S800]. And, as mentioned earlier in FIG. 1, the mobile device can generate a first response data to make a response to the first voice command [S810]. In this case, the mobile device can select a feedback scheme to output the first response data. The selected feedback scheme may vary according to a tilt angle of the mobile device. Of course, the mobile device can select a feedback scheme according to a different condition such as a grip pattern of a user, whether a gaze of a user is detected, distance from a user and the like as well as the tilt angle.

Subsequently, as mentioned earlier in FIG. 2 to FIG. 3, the mobile device can determine whether a tilt angle of the mobile device belongs to a first tilt range [S820]. The first tilt range corresponds to an angle range for tilting the mobile device to make the top part of the mobile device to be positioned higher than the bottom part of the mobile device on the basis of a horizontal state of the mobile device.

In this case, if a tilt angle belongs to the first tilt range, the mobile device can select a first feedback scheme [S830]. And, as mentioned earlier in FIG. 4, the mobile device displays the first response data at a first point corresponding to the top part of a screen [S840] and may be able to display additionally generated second response data in first direction ranging from the first point to a second point corresponding to the bottom part of the screen [S850].

Yet, if a tilt angle does not belong to the first tilt range, the mobile device can select a second feedback scheme [S860]. Subsequently, as mentioned earlier in FIG. 5, the mobile device displays the first response data at the second point [S870] and may be able to display the additionally generated second response data in second direction ranging from the second point to the first point [S880].

In other word, having selected the second feedback scheme, the mobile device moves the first response data in the second direction and may be able to display the second response data at the second point.

What is claimed is:

1. A mobile device, comprising:
a display unit;
an audio unit;

a sensor unit configured to sense a tilt angle of the mobile device; and a processor configured to control the display unit, the audio unit and the sensor unit, wherein the processor is further configured to:

receive a first voice command, generate a first response data to make a response to the first voice command, select a feedback scheme to output the first response data, wherein if the tilt angle belongs to a first tilt range, a first feedback scheme is selected and wherein if the tilt angle belongs to a second tilt range, a second feedback scheme is selected, if the first feedback scheme is selected, display the first response data at a first point corresponding to the top part of a screen and display additionally generated second response data in a first direction ranging from the first point to a second point corresponding to the bottom part of the screen, and if the second feedback scheme is selected, display the first response data at the second point corresponding to the bottom part of the screen and display the additionally generated second response data in a second direction ranging from the second point to the first point.

2. The mobile device of claim 1, wherein if the second feedback scheme is selected, the processor is further configured to move the first response data in the second direction and display the second response data at the second point.

3. The mobile device of claim 1, wherein the processor is further configured to:

receive a second voice command, generate a third response data to make a response to the second voice command, and if there is no empty space on the screen, move at least one of the first response data and the second response data displayed on the screen in the second direction and display the third response data at the second point.

4. The mobile device of claim 3, wherein if there is no empty space on the screen, the processor is further configured to move at least one of the first response data and the second response data in the second direction irrespective of the selected feedback scheme and display the third response data at the second point.

5. The mobile device of claim 1, wherein the processor is further configured to:

detect a grip pattern of a user for the mobile device, if the grip pattern corresponds to a first grip pattern, select the first feedback scheme, and if the grip pattern corresponds to a second grip pattern, select the second feedback scheme.

6. The mobile device of claim 1, wherein the processor is further configured to:

detect a gaze of a user, if the gaze of the user is detected, select the first feedback scheme, and if the gaze of the user is not detected, configured to select the second feedback scheme.

7. The mobile device of claim 1, wherein the processor is further configured to:

detect a face of a user, if the detected face of the user corresponds to a first condition, select the first feedback scheme, and if the detected face of the user corresponds to a second condition, select the second feedback scheme.

8. The mobile device of claim 7, wherein the first condition and the second condition are determined by at least one of a part of the detected face of the user, a position of the face and an area of the face.

9. The mobile device of claim 1, wherein the processor is further configured to:

detect a distance between the audio unit and a user using the first voice command, if the distance is longer than a predetermined reference, select the first feedback scheme, and if the distance is shorter than the predetermined reference, select the second feedback scheme.

10. The mobile device of claim 1, wherein the first response data comprises first audio data and the second response data comprises second audio data.

11. The mobile terminal of claim 10, wherein the processor is further configured to:

if the first feedback scheme is selected, not to output the first audio data and the second audio data, and if the second feedback scheme is selected, output the first audio data and the second audio data.

12. The mobile terminal of claim 1, wherein the first tilt range corresponds to an angle range for tilting the mobile device to make the top part of the mobile device to be positioned higher than the bottom part of the mobile device on the basis of a horizontal state of the mobile device.

13. The mobile terminal of claim 1, wherein the second tilt range corresponds to an angle range for tilting the mobile device to make the top part of the mobile device to be positioned lower than the bottom part of the mobile device on the basis of a horizontal state of the mobile device.

14. A method of controlling a mobile device, comprising the steps of:

receiving a first voice command;

generating a first response data to make a response to the first voice command;

selecting a feedback scheme to output the first response data, wherein if the tilt angle belongs to a first tilt range, a first feedback scheme is selected and wherein if the tilt angle belongs to a second tilt range, a second feedback scheme is selected;

if the first feedback scheme is selected, displaying the first response data at a first point corresponding to the top part of a screen and displaying additionally generated second response data in a first direction ranging from the first point to a second point corresponding to the bottom part of the screen; and if the second feedback scheme is selected, displaying the first response data at the second point corresponding to the bottom part of the screen and displaying the additionally generated second response data in a second direction ranging from the second point to the first point.

15. The method of claim 14, wherein if the second feedback scheme is selected, the step of displaying the first response data at the second point corresponding to the bottom part of the screen and displaying the additionally generated second response data in second direction ranging from the second point to the first point, comprising the steps of:

moving the first response data in the second direction; and displaying the second response data at the second point.

16. The method of claim 14, further comprising the steps of:

receiving a second voice command;

generating a third response data to make a response to the second voice command; and if there is no empty space on the screen, moving at least one of the first response data and the second response data displayed on the screen in the second direction and displaying the third response data at the second point.

17. The method of claim 14, wherein if there is no empty space on the screen, the step of moving at least one of the first response data and the second response data displayed on the screen in the second direction and displaying the third response data at the second point is not relevant to the selected feedback scheme.

18. The method of claim 14, further comprising the steps of:
   detecting a gaze of a user; and
   selecting the first feedback scheme in case of detecting the gaze of the user and selecting the second feedback scheme in case of not detecting the gaze of the user.

19. The method of claim 14, wherein the first tilt range corresponds to an angle range for tilting the mobile device to make the top part of the mobile device to be positioned higher than the bottom part of the mobile device on the basis of a horizontal state of the mobile device.

20. The method of claim 14, wherein the second tilt range corresponds to an angle range for tilting the mobile device to make the top part of the mobile device to be positioned lower than the bottom part of the mobile device on the basis of a horizontal state of the mobile device.

* * * * *